United States Patent Office 2,726,240
Patented Dec. 6, 1955

2,726,240
STEROID COMPOUNDS

Robert B. Moffett, Kalamazoo, Mich., assignor to The Upjohn Company, Kalamazoo, Mich., a corporation of Michigan No Drawing. Application January 4, 1954,
Serial No. 402,156

6 Claims. (Cl. 260—239.55)

The present invention relates to diepoxy steroid compounds of the pregnane series, and is more particularly concerned with the novel 3,21-dihydroxy-5(6),16(17)-dioxidopregnan-20-one, its 3,21-diesters and a novel process for the production thereof.

The novel compounds of the present invention may be represented by the formula:

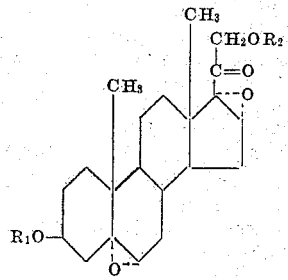

wherein $R_1$ and $R_2$ are selected from the group consisting of hydrogen and acyl radicals of hydrocarbon carboxylic acids containing up to and including eight carbon atoms.

The process of the present invention consists of treating a 3,20-diacyloxy-5α(6α),16α(17α)-dioxido-20-pregnene with bromine to obtain 3-acyloxy-5α(6α),16α(17α)-dioxido-21-bromopregnan-20-one. The 3-acyloxy-5α(6α), 16α(17α)-dioxido-21-bromopregnane-20-one is then converted to the corresponding 21-iodopregnane by treatment with sodium iodide in acetone and the thus obtained 21-iodopregnane is then treated with a potassium salt of an organic acid to produce 3β,21-diacyloxy-5α(6α), 16α(17α)-dioxido-pregnan-20-one. Hydrolysis of this dioxidopregnane diester with at least two moles of an alkali reagent yields 3β,21-dihydroxy-5α(6α),16α(17α)-dioxidopregnan-20-one.

It is an object of the present invention to provide 3,21-dihydroxy-5α(6α),16α(17α)-dioxidopregnan-20-ones and the 3,21-diesters thereof. Another object of the present invention is the preparation of 3,21-dihydroxy-5α(6α), 16α(17α)-dioxido-pregnan-20-one and the 3,21-diesters thereof, which involves conversion of an enol acylate group to an α-bromo keto group by treatment with elemental bromine in a non-aqueous medium. Other objects of the present invention will be apparent to those skilled in the art to which this invention pertains.

The diepoxides of this invention are valuable intermediates in the preparation of physiologically active steroid compounds. For example, Reichstein's Compound S and Kendall's Compound F can be obtained from 3β,21-diacyloxy-5α(6α),16α(17α)-dioxido-pregnan-20-one, illustratively 3β,21-diacetoxy-5α(6α),16α(17α)-dioxidopregnan-20-one, or from 3β,21-dihydroxy-5α(6α), 16α(17α)-dioxidopregnan-20-one by treatment with hydrogen bromide followed by Raney nickel reduction to give 3β,21-diacyloxy-5,17α-dihydroxypregnan-20-one, illustratively 3β,21 - diacetoxy - 5α(6α),16α(17α)-dioxido-pregnan-20-one or 3β,5,17α,21-tetra-hydroxypregnan-20-one. Selective oxidation (e. g., Oppenauer oxidation) of 3β,5,17α,21 - tetrahydroxy-21-acetoxypregnan-20-one (which is also obtainable from a 3β,21-diacyloxy-5,17α-dihydroxypregnan-20-one, illustratively 3β,21-diacetoxy-5α(6α),16α(17α)-dioxidopregnan-20-one by hydrolysis) gives 5,17 α- dihydroxy - 21 - acetoxypregnane-3,20-dione which when boiled with alcoholic potassium carbonate yields 17α,21-dihydroxy-4-pregnene-3,20-dione (Compound S). Treatment of Reichstein's Compound S with Streptomyces fradiae [cf. Colingsworth et al., J. Am. Chem. Soc. 74, 2381 (1952)] yields Kendall's Compound F (11β,17α,21-trihydroxy-4-pregnene-3,20-dione).

The starting compounds of the present invention are the 3β,20 - diacyloxy - 5α(6α),16α(17α)-dioxido-20-pregnene, made by epoxidation of 3β,20-diacyloxy-5,16,20-pregnatrienes. These compounds are made from known 3β-hydroxy-5,16-pregnadien-20-one (16-dehydropregnenolone) or from the 3-esters thereof by esterification, enol esterification and epoxidation. The esterification and enol esterification is usually made with an isopropenyl ester as illustrated by the method of Moffett et al., J. Am. Chem. Soc. 74, 2183 (1952), for the preparation of 3β,20-diacetoxy-5,16,20-pregnatriene, (cf. Preparation 1).

The esters of 3β-hydroxy-5,16-pregnadien-20-one are obtained by admixing 3β-hydroxy-5,16-pregnadien-20-one (16-dehydropregnenolone) with an acylating agent such as, for example, ketene, an acid, an acid chloride or bromide or an acid anhydride or other known acylating agents, which may be substituted by nitro, thio, methoxy, ethoxy, or hydroxy groups usually in a solvent such as, for example, pyridine, or the like, or an inert solvent, including solvents like benzene, toluene, ether and the like, and heating at a temperature between about zero degrees centigrade and the boiling point of the reaction mixture, suitably about room temperature, for a period between about one-half and about 96 hours. The time of reaction as well as the temperature at which the reaction is carried out, the acylating agent, and the ratio of reactants can be varied. The ester is recovered from the reaction mixture by evaporating the solvent or, in case of a water-miscible solvent by pouring the reaction mixture into ice or cold water, collecting in an appropriate solvent, and washing with successive portions of a mildly basic solution and water to obtain a solution of the product which is essentially neutral. In some instances, the ester crystallizes from the reaction mixture, in which case it is advantageously separated by filtration or other means, washed with water, and thereafter purified by conventional means, such as by recrystallization from a suitable solvent or by chromatographic purification, as deemed necessary.

In order to obtain the desired 3β,20-diacyloxy-5α(6α), 16α(17α)-dioxido-20-pregnene, the selected 3β,20-diacyloxy-5,16,20-pregnatriene, either as a solid or dissolved in an organic solvent, is admixed with the solution or an epoxidizing agent such as perbenzoic acid, in an organic solvent and separated by conventional procedures as shown in Preparation 2.

In carrying out the process of the present invention crude or purified 3β,20-diacyloxy-5α(6α),16α(17α)-dioxido-20-pregnene, dissolved in an organic solvent such as, illustratively, dichloromethylene, chloroform, carbon tetrachloride, benzene, toluene, or hexane is admixed with bromine dissolved in the same type of organic solvent. Low boiling solvents, for example, methylene dichloride, are preferred. The bromine, dissolved in methylene dichloride, is advantageously added to the chilled solution of the selected 3β,20-diacyloxy-5α(6α),16α(17α)-dioxidopregnan-20-one. Temperatures between minus twenty and plus ten degrees are preferable for this bromination reaction, but higher or lower temperatures are operative. In the preferred embodiment of this invention the amount of bromine employed is in a ratio of one mole of steroid to one mole of bromine, although greater or lesser amounts of bromine may be used. The time of reaction, while not critical, depends on the temperature, the amount of bromine solution employed, the concentration, and the degree of agitation. Preferably, the bromine solution is 0.1 to 0.5 normal in bromine and is added at a rate such that each drop of solution is discolored before the next is added. At the completion of the reaction the solvent is removed by distillation preferably at reduced pressure, and the residue, 3β-acyloxy-21-bromo-5α(6α),16α(17α)-dioxidopregnan-20-one is recrystallized from organic solvents, such as acetone, methanol, ethanol, Skellysolve B hexane mixture, low boiling petroleum ethers (pentane mixtures) and mixtures of these solvents, and the like.

In order to obtain a 3β,21-acyloxy-5α(6α),16α(17α)-dioxido-pregnan-20-one, the 21-bromo compound is first converted to the 21-iodide. This conversion is carried out by refluxing 3β-acyloxy-21-bromo-5α(6α),16α(17α)-dioxidopregnan-20-one with sodium iodide in acetone at ordinary pressure. A two to five times molar excess of sodium iodide is usually employed and the time of reflux is between five minutes and one hour. The thus-obtained iodide is insoluble in acetone and is removed by filtration. The precipitate is washed with water until free of excess sodium iodide or of the sodium bromide formed in the reaction. The crude material is then admixed with the alkali salt of the selected carboxylic acid. The preferred acids are hydrocarbon carboxylic acids containing up to and including eight carbon atoms, but other organic carboxylic acids substituted by nitro, hydroxy, thio, methoxy or ethoxy groups are also operative. The alkali salt, preferably the sodium or potassium salt of the selected acid, may be added as a solid in powdered form or may be produced in situ by adding the acid as a liquid or powder to powdered potassium or sodium bicarbonate. An excess of the selected salt or the bicarbonate and selected acid is preferably employed. If the desired acylate is an ester of an acid which is a liquid at room temperature (twenty to thirty degrees centigrade) such as acetic, propionic, butyric, valeric, isovaleric, hexanoic, heptanoic, octanoic, and the like, either method can be employed. If the acid is at room temperature a solid, such as trimethylacetic, phenylacetic, benzoic, toluic, anisic, gallic, tartaric, citric, maleic, succinic, salicylic, it is preferable to employ the sodium or potassium salt of these acids. In either method the acetone solution of 3β-acyloxy-5α(6α),16α(17α)-dioxido-21-idopregnan-20-one is refluxed in acetone solution at normal pressure with an alkali salt, such as the sodium or potassium salt of the selected organic acid, or with potassium or sodium bicarbonate and the selected organic acid for a period of one to 48 hours usually for a period of ten to fifteen hours. Agitation of the reaction mixture by mechanical stirring or by the use of a shaking device is advantageous in this reaction. After completion of the reaction, the mixture is diluted with water and extracted with a water-immiscible organic solvent, such as ether, methylene dichloride, chloroform, benzene, or the like. The product, a 3β,21-diacyloxy-5α(6α),16α(17α)-dioxido-pregnan-20-one is recovered from the organic layer by evaporating the solvent and recrystallizing the residue from solvents such as methanol, ethanol, ether, Skellysolve B hexanes, acetone, mixtures of these, and the like.

3β,21-diacyloxy-5α(6α),16α(17α)-dioxidopregnan-20-one may be hydrolyzed by dissolving it in an organic solvent such as methanol or ethanol, and admixing with at least two moles, preferably with a slight excess of two moles of sodium or potassium hydroxide per mole of diester; whereafter the mixture is maintained at a temperature between zero and thirty degrees for a period of thirty minutes to two hours. The reaction mixture is then poured into ice water and the resulting precipitate is collected on a filter and purified by conventional procedures, such as by recrystallization from methanol or ethanol to yield 3β,21-dihydroxy-5α(6α),16α(17α)-dioxido-pregnan-20-one.

The following examples are illustrative of the process and products of the present invention, but are not to be construed as limiting.

PREPARATION 1.—3β,20-DIACETOXY-5,16,20-PREGNATRIENE

A solution of about 1.0 grams of 3α-acetoxy-5,16-pregnadien-20-one and 0.15 gram of para-toluenesulfonic acid monohydrate in about twenty milliliters of isopropenyl acetate was slowly distilled for a period of about ten hours through a short fractionating column. From time to time isopropenyl acetate was added to keep the volume of the solution above ten milliliters. After cooling the solution remaining in the flask, one gram of sodium bicarbonate was added and the remaining isopropenyl acetate was removed by distillation in vacuo at a temperature below thirty degrees centigrade. The residue was shaken with ether and ice water, the water layer was extracted with more ether and the combined ether layer was washed with saturated sodium chloride solution, water and dried over anhydrous sodium sulfate. The ether was removed under reduced pressure and the residue was recrystallized from methyl alcohol to yield 3β,20-diacetoxy-5,16,20-pregnatriene.

In a manner similar to Preparation 1, by reacting 3β-hydroxy-5,16-pregnadien-20-one or a 3β-ester thereof with an isopropenyl ester other representative 3β,20-diacyloxy-5,16,20-pregnatrienes may be prepared such as illustratively 3β,20-dipropionoxy-5,16,20-pregnatriene, 3β,20-dibutyryloxy-5,16,20-pregnatriene, 3β,20-divaleryloxy-5,16,20-pregnatriene, 3β,20-dihexanoyloxy-5,16,20-pregnatriene, and the like, or mixed esters such as, for example, 3β-acetoxy- or 3β-benzoyloxy-20-propionoxy-5,16,20-pregnatriene.

PREPARATION 2.—3β,20-DIACETOXY-5α(6α),16α(17α)-DIOXIDO-20-PREGNENE

A solution containing 0.57 gram (4.12 millimoles) of perbenzoic acid in fifteen milliliters of benzene was added to 0.50 gram (1.26 millimoles) of 3β,20-diacetoxy-5,16,20-pregnatriene. The resulting solution was maintained in the dark for thirty minutes after which period 2.07 molar equivalents of perbenzoic acid had been consumed as determined by titration of an aliquot sample. Titration of a second aliquot sample fifteen minutes later showed no change in peracid concentration. To the reaction mixture was now added ether and cracked ice. The ether phase was separated, washed with cold five percent sodium hydroxide solution and subsequently with water until the wash-water was neutral. The ether solution was then dried over anhydrous sodium sulfate and evaporated under reduced pressure (the ether was distilled below thirty degrees centigrade) to yield a glassy residue. This residue was twice recrystallized from methanol to give 3β,20-diacetoxy-5α(6α),16α(17α)-dioxido-20-pregnene of melting point 162 to 163 degrees centigrade.

*Analysis.*—Calculated for $C_{25}H_{34}O_6$: C, 69.74; H, 7.96. Found: C, 69.72; H, 8.02.

In a manner similar to Preparation 2, by treating a selected 3β,20-diacyloxy-5,16,20-pregnatriene with a peracid such as performic, peracetic, perbenzoic, monoperphthalic acid, and the like, other representative 3,20-diacyloxy-5α(6α),16α(17α)-dioxido-20-pregnenes may be prepared, such as illustratively 3β,20-dipropionyloxy-5α(6α),16α(17α)-dioxido-20-pregnene, 3β,20-dibutyryloxy-5α(6α),16α(17α)dioxido-20-pregnene, 3β,20-divaleryloxy-5α(6α),16α(17α)-dioxido-20-pregnene, 3β,20-dihexanoyloxy-5α(6α),16α(17α)-dioxido-20-pregnene, 3β,20-diheptanoyloxy-5α(6α),16α(17α)-dioxido-20-pregnene, 3β,20-dioctanoyloxy-5α(6α),16α(17α)-dioxido-20-pregnene, 3β-benzoyloxy-20-acetoxy-5α(6α),16α(17α)-dioxido-20-pregnene, 3β-acetoxy-20-propionyloxy-5α(6α),16α(17α)-dioxido-20-pregnene, and the like.

Example 1.—3β-acetoxy-5α(6α),16α(17α)-dioxido-21-bromopregnan-20-one

A solution of 0.265 gram (0.000615 mole) of 3β,20-diacetoxy-5α(6α),16α(17α)-dioxido-20-pregnene, in five milliliters of methylene dichloride, was cooled in an ice bath to minus ten degrees centigrade. Thereto was added dropwise, under stirring, 4.43 milliliters of a 0.278 normal bromine solution in methylene dichloride containing 0.000615 mole of bromine. The addition was completed during a period of thirty minutes. The solvent was then removed under reduced pressure below room temperature, yielding a crude product. The crude product was dissolved in methanol at the boiling point and allowed to cool to room temperature. The crystals which separated were collected immediately and recrystallized from methylene dichloride and methanol to yield pure 3β-acetoxy-5α(6α),16α(17α)-dioxido-21-bromopregnan-20-one of melting point 199 to 202 degrees centigrade and $[\alpha]_D -11°$ (0.610 percent in chloroform).

Analysis.—Calc. for $C_{23}H_{31}BrO_5$: C, 59.10; H, 6.69; Br, 17.10. Found: C, 59.09; H, 6.93; Br, 16.89.

Example 2.—3β,21-diacetoxy-5α(6α),16α(17α)-dioxidopregnan-20-one

A mixture of 0.07 gram of 3β-acetoxy-5α(6α),16α(17α)-dioxido-21-bromopregnan-20-one, 0.06 gram of powdered sodium iodide and five millimeters of acetone was refluxed at normal pressure (about 720 to 760 millimeters) for a period of fifteen minutes and the reaction mixture was then filtered. The filtrate, containing 3β-acetoxy-5α(6α),16α(17α)-dioxido-21-iodopregnan-20-one, was admixed with 0.5 gram of potassium bicarbonate and 0.9 milliliter of acetic acid. The mixture was shaken under reflux (at normal pressure) for a period of twelve hours, diluted with ice water and extracted with ether. The ether solution was washed with cold dilute sodium thiosulfate, water, a saturated salt solution, and then dried over anhydrous sodium sulfate. The solvent was removed under reduced pressure and the remaining product was recrystallized from methanol to give white crystals of 3β,21-diacetoxy-5α(6α),16α(17α)-dioxidopregnan-20-one of melting point 192 to 194 degrees centigrade.

Analysis.—Calculated for $C_{25}H_{34}O_7$: C, 67.25; H, 7.68. Found: C, 67.46; H, 7.84.

Example 3.—3β-benzoyloxy-5α(6α),16α(17α)-dioxido-21-bromopregnan-20-one

In the same manner as given in Example 1, 3β-benzoyloxy-5α(6α),16α(17α)-dioxido-20-pregnene may be treated with bromine in methylene dichloride to yield 3β-benzoyloxy-5α(6α),16α(17α)-dioxido-21-bromopregnan-20-one.

Example 4.—3β-benzoyloxy-5α(6α),16α(17α)-dioxido-21-acetoxy-pregnan-20-one

In the same manner as given in Example 2, 3β-benzoyloxy-5α(6α),16α(17α)-dioxido-21-bromopregnane may be treated with sodium iodide in acetone and subsequently the thus-obtained 21-iodide may be treated with potassium bicarbonate and acetic acid in acetone to yield 3β-benzoyloxy-5α(6α),16α(17α)-dioxido-21-acetoxypregnan-20-one.

Example 5.—3β-propionyloxy-5α(6α),16α(17α)-dioxido-21-bromo-pregnan-20-one

In the manner given in Example 1, 3β-propionyloxy-5α(6α),16α(17α)-dioxido-20-pregnene may be treated with bromine in methylene dichloride to yield 3β-propionyloxy-5α(6α),16α(17α)-dioxido-21-bromopregnan-20-one.

Example 6.—3β-propionyloxy-5α(6α),16α(17α)-dioxido-21-acetoxy-pregnan-20-one In the same manner as given in Example 2, 3β-propionyloxy-5α(6α),16α(17α)dioxido-21-bromopregnan-20-one may be treated with sodium iodide in acetone and subsequently the thus-obtained 21-iodide may be treated with potassium bicarbonate and acetic acid in acetone to yield 3β-propionyloxy-5α(6α),16α(17α)-dioxido-21-acetoxypregnan-20-one.

Example 7.—3β,21-dibenzoyloxy-5α(6α),16α(17α)-dioxidopregnan-20-one

In the same manner as given in Example 2, 3β-benzoyloxy-5α(6α),16α(17α)-dioxido-21-bromopregnan-20-one, as obtained in Example 3, may be dissolved in acetone and refluxed with an excess of sodium iodide and subsequently the thus-obtained 21-iodide may be treated with sodium benzoate to yield 3β,21-dibenzoyloxy-5α(6α),16α(17α)-dioxidopregnan-20-one.

Example 8.—3β-acetoxy-5α(6α),16α(17α)-dioxido-21-benzoyloxypregnan-20-one

In the same manner as given in Example 2, 3β-acetoxy-5α(6α),16α(17α)-dioxido-21-bromopregnan-20-one may be treated with sodium iodide in acetone and subsequently the thus-obtained 21-iodide may be refluxed with an excess of sodium benzoate to yield 3β-acetoxy-5α(6α),16α(17α)-dioxido-21-benzoyloxypregnan-20-one.

In a manner similar to Examples 1 through 8, by reacting a 3β,20-diacyloxy-5α(6α),16α(17α)-dioxido-20-pregnene with bromine and subsequently treating the thus-obtained 3β-acyloxy-5α(6α),16α(17α)-dioxido-21-bromopregnan-20-one with sodium iodide in acetone and then with an alkali salt of a selected organic acid containing up to and including eight carbon atoms, other representative 3β,21-diacyloxy-5α(6α),16α(17α)-dioxidopregnan-20-ones may be obtained, such as illustratively 3β,21-dipropionyloxy-5α(6α),16α(17α)-dioxidopregnan-20-one, 3β,21-dibutyryloxy-5α(6α),16α(17α)-dioxidopregnan-20-one, 3β,21-divaleryloxy-5α(6α),16α(17α)-dioxidopregnan-20-one, 3β,21-diisovaleryloxy-5α(6α),16α(17α)-dioxidopregnan-20-one, 3β,21-dihexanoyloxy-5α(6α),16α(17α)-dioxidopregnan-20-one; 3β-acetoxy-5α(6α),16α(17α)-dioxido-21-propionyloxypregnan-20-one, 3β-acetoxy-5α(6α),16α(17α)-dioxido-21-butyryloxypregnan-20-ones, 3β-acetoxy-5α(6α),16α(17α)-dioxido-21-valeryloxypregnan-20-one, 3β-acetoxy-5α(6α),16α(17α)-dioxido-21-isovaleryloxypregnan-20-one, 3β-acetoxy-5α(6α),16α(17α)-dioxido-21-hexanoyloxypregnan-20-one, 3β-acetoxy-5α(6α),16α(17α)-dioxido-21-(β-cyclopentylpropionoxy)-pregnan-20-one, 3β-butyryloxy-5α(6α),16α(17α)-dioxido-21-acetoxypregnan-20-one, 3β-valeryloxy-5α(6α),16α(17α)-dioxido-21-acetoxypregnan-20-one, and the like.

Example 9.—3β,21-dihydroxy-5α(6α),16α(17α)-dioxido-pregnan-20-one

A solution of 0.5 gram of 3β,21-diacetoxy-5α(6α),16α(17α)-dioxidopregnan-20-one and 0.15 gram of sodium hydroxide in fifteen milliliters of methanol may be heated on the water bath for a period of thirty minutes, adding methanol when necessary to keep the volume approximately constant. The reaction mixture is then poured into 100 milliliters of water, neutralized with dilute hydrochloric acid, and the precipitate thus formed is collected on a filter and recrystallized from methanol to yield 3β,21-dihydroxy-5α(6α),16α(17α)-dioxidopregnan-20-one.

In a manner similar to Example 9, other 3β,21-diacyloxy-5α(6α),16α(17α)-dioxidopregnan-20-ones, such as those found in Examples 1 through 8, when treated with excess base, such as sodium hydroxide, potassium hydroxide or barium hydroxide, will yield 3β,21-dihydroxy-5α(6α),16α(17α)-dioxidopregnan-20-one.

It is to be understood that this invention is not to be limited to the exact details of operation or exact compounds shown and described as obvious modifications and equivalents will be apparent to one skilled in the art and the invention is therefore to be limited only by the scope of the appended claims.

I claim:
1. A process for the production of a diepoxypregnane compound of the formula:

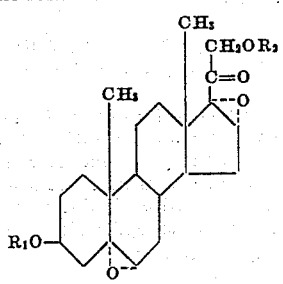

wherein $R_1$ and $R_2$ are selected from the group consisting of hydrogen and acyl radicals of carboxylic acids containing up to and including eight carbon atoms, which comprises the steps: treating a 3β,20-diacyloxy-5α(6α), 16α(17α)-dioxido-20-pregnene, wherein the acyl radicals are defined as above, with bromine at a temperature between minus twenty and plus ten degrees to obtain a 3β - acyloxy-5α(6α),16α(17α)-dioxido-21-bromopregnan-20-one, treating the thus-obtained 21-bromo compound with sodium iodide in acetone to obtain a 3β-acyloxy-5α(6α),16α(17α)-dioxido-21-iodopregnan - 20 - one and treating the 21-iodopregnane with an alkali salt of a carboxylic acid containing up to and including eight carbon atoms, to obtain the corresponding 3β,21-diacyloxy-5α(6α),16α(17α)-dioxidopregnan-20-one.

2. A process for the production of 3β,21-diacetoxy-5α(6α),16α(17α) - dioxidopregnan - 20 - one which comprises treating a 3β-acetoxy-5α(6α),16α(17α)-dioxido-20-acyloxy-20-pregnene, wherein the acyl radical is of a carboxylic acid containing up to and including eight carbon atoms, with bromine, at a temperature between minus twenty and plus ten degrees centigrade, to obtain 3β - acetoxy - 5α(6α),16α(17α) - dioxido - 21 - bromopregnan-20-one, then treating the thus-obtained 21-bromo compound with sodium iodide in acetone to obtain 3β - acetoxy - 5α(6α),16α(17α) - dioxido - 21 - iodopregnan-20-one and heating the 21-iodopregnane with an alkali acetate to obtain 3β,21-diacetoxy-5α(6α),16α-(17α)-dioxidopregnan-20-one.

3. The process of claim 2, wherein the starting 3β-acetoxy - 5α(6α),16α(17α) - dioxido - 20 - acyloxy - 20-pregnene is 3β,20 - diacetoxy - 5α(6α),16α(17α) - dioxido-20-pregnene.

4. A process for the production of 3β,21-dihydroxy-5α(6α),16α(17α) - dioxidopregnan - 20 - one which comprises: treating a 3β,20 - diacyloxy - 5α(6α),16α(17α)-dioxido-20-pregnene, wherein the acyl radicals are of a carboxylic acid containing up to and including eight carbon atoms, with bromine at a temperature between minus twenty and plus ten degrees to obtain a 3β-acyloxy - 5α(6α),16α(17α) - dioxido - 21 - bromopregnan-20-one, treating the thus-obtained 21-bromo compound with sodium iodide in acetone to obtain a 3β-acyloxy-5α(6α),16α(17α) - dioxido - 21 - iodopregnan - 20 - one and treating the 21-iodopregnane with an alkali salt of a carboxylic acid containing up to and including eight carbon atoms, to obtain the corresponding 3β,21-diacyloxy - 5α(6α),16α(17α) - dioxidopregnan - 20 - one, and hydrolyzing the thus-obtained diester with at least two equivalents of base.

5. A process for the production of 3β,21-dihydroxy-5α(6α),16α(17α) - dioxidopregnan - 20 - one which comprises treating a 3β,20 - diacyloxy - 5α(6α),16α(17α)-dioxido-20-pregnene wherein the acyl radical is of a carboxylic acid containing up to and including eight carbon atoms with bromine, to obtain a 3β-acyloxy-5α(6α),16α-(17α) - dioxido - 21 - bromopregnan - 20 - one, treating the thus-obtained 21-bromo compound with sodium iodide in acetone to obtain a 3β-acyloxy-5α(6α),16α-(17α) - dioxido - 21 - iodopregnan - 20 - one, treating the 21-iodopregnane with potassium acetate, to obtain 3β,21 - diacetoxy - 5α(6α),16α(17α) - dioxido pregnan-20-one and hydrolyzing the diacetate with at least two equivalents of alkali base per mole of diester to obtain 3β,21 - dihydroxy - 5α(6α),16α(17α) - dioxidopregnan-20-one.

6. The process of claim 5 wherein the 3β,20-diacyloxy - 5α(6α),16α(17α) - dioxidopregnan - 20 - one is 3β,20 - diacetoxy - 5α(6α),16α(17α) - dioxidopregnan-20-one.

References Cited in the file of this patent
UNITED STATES PATENTS

| 2,312,344 | Logemann | Mar. 2, 1943 |
| 2,323,277 | Miescher | June 29, 1943 |
| 2,602,769 | Murray | July 8, 1952 |
| 2,686,181 | Julian | Aug. 10, 1954 |

OTHER REFERENCES

Moffet: J. Am. Chem. Soc. 74, pp. 2183–85 (1952).